May 30, 1950   H. G. HUGHEY   2,509,270
CUTTING OR SCARFING TORCH
Filed Oct. 19, 1946
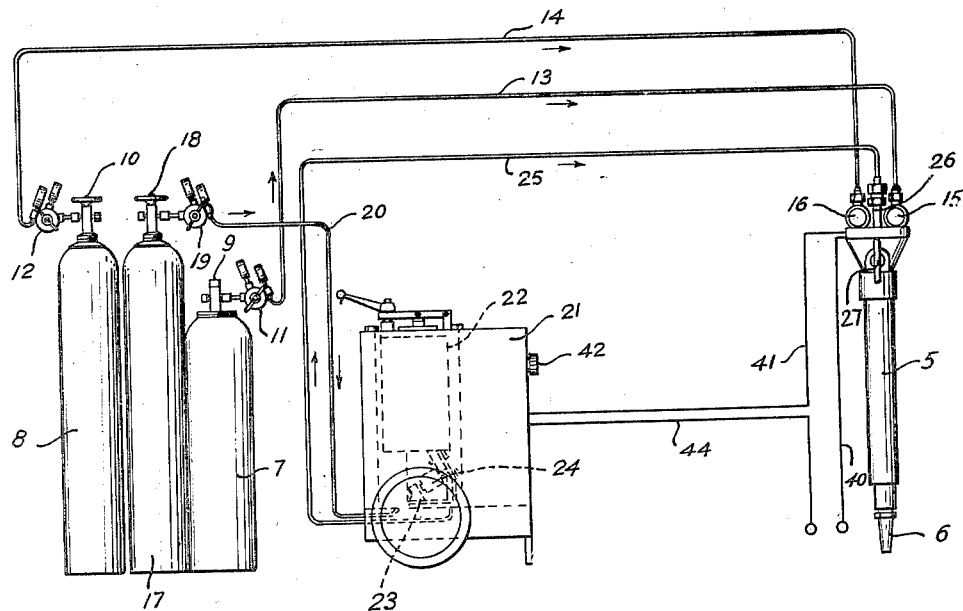
FIG. 1
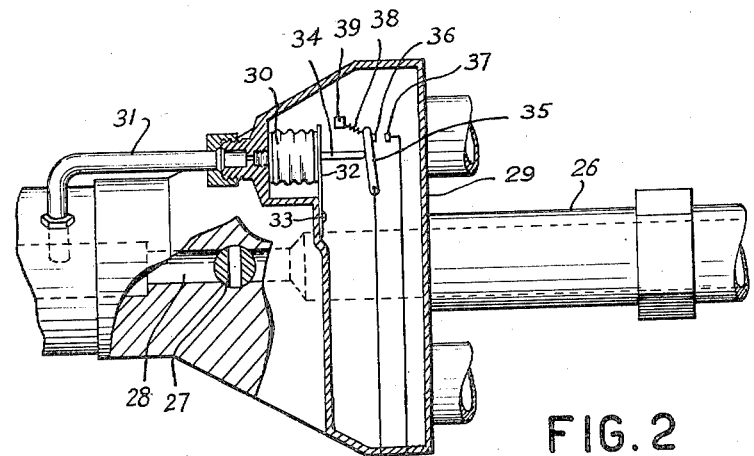
FIG. 2
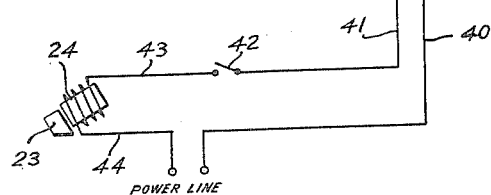
INVENTOR
HOWARD G. HUGHEY
BY
Pennie Edmonds Morton & Barrows
ATTORNEYS Patented May 30, 1950

2,509,270

UNITED STATES PATENT OFFICE 2,509,270

CUTTING OR SCARFING TORCH

Howard G. Hughey, Fanwood, N. J., assignor to Air Reduction Company, Incorporated, New York, N. Y., a corporation of New York Application October 19, 1946, Serial No. 704,475

1 Claim. (Cl. 110—22)

This invention relates to the cutting of metals and particularly to the application of a stream of oxygen with an entrained flux in pulverulent form to oxidize and remove a portion of the metal.

To utilize a flux with oxygen in the cutting operation, it is necessary to feed the flux uniformly to the oxygen stream. This may be accomplished by suitable feeding means, for example the mechanism described in the application of Joseph M. Tyrner, Serial No. 696,258, filed September 11, 1946, for Apparatus for feeding powdered material, and owned by the same assignee. The feeding means such as that described in the application mentioned is actuated by an electric motor. There are various circumstances which may lead to reduction or failure of the oxygen supply during operation of the apparatus. In that case, the continued feeding of the flux will tend to clog the oxygen line with flux and prevent proper operation, even if the supply of oxygen is restored.

A mechanical connection between the oxygen valve and the flux-feeder control merely presumes the presence of a carrier. A line impediment is only aggravated by a construction having the operation of the feeder controlled by a mechanical connection with the oxygen valve. With this invention the control of the flux is definitely related to the actual presence of the carrier; and in addition to the control in the event of a blocked oxygen line, this invention also provides automatic control if there is a line break or a failure of the oxygen supply at its source.

It is the object of the present invention to provide a simple and effective apparatus whereby the feeding of flux to the oxygen system is dependent upon the continued maintenance of the flow of oxygen to a point near the orifice from which the oxygen and entrained flux are discharged.

Other objects and advantages of the invention will be apparent as it is better understood by reference to the following specification and the accompanying drawing, in which Fig. 1 is a diagrammatic view of an apparatus embodying the invention; and Fig. 2 is an enlarged sectional view of the end of the torch showing the controlling device incorporated therewith.

Referring to the drawing, 5 indicates a cutting torch having the usual tip 6 adapted to deliver heating and cutting jets. The heating jets are supplied with fuel and oxygen from sources such as the cylinders 7 and 8 respectively. Valves 9 and 10 and regulators 11 and 12 control the flow of gases through the conduits 13 and 14 to the torch 5. Valves 15 and 16 are provided on the torch to control the flow of the gases therethrough.

Oxygen for the cutting jet is supplied from any suitable source such as the cylinder 17 having a valve 18 and regulator 19 to control the flow through a conduit 20. The conduit is connected to any suitable feeding apparatus 21, such for example as that disclosed in the Tyrner application hereinbefore mentioned. In the apparatus as shown, the flux is disposed in a suitable receptacle 22 and is delivered therefrom to a table 23 actuated by an electric motor 24. The powdered flux is sifted into the stream of oxygen delivered by the conduit 20 and is carried therewith through a conduit 25 to the inlet connection 26 of the torch 5. This apparatus for feeding flux into the oxygen stream is merely representative of powder-dispensing means that may be used for the purposes of this invention. A manually operable valve 27 is disposed in a passage 28 within the torch through which the oxygen and entrained flux pass to the tip 6.

A casing 29 is formed by a recess in the body of the torch 5 and encloses a bellows 30 which communicates through a pipe 31 with the passage 28 within the torch, so that the pressure of the gas in the passage 28 affects the bellows 30. The casing 29 can be made as a detachable element which may or may not be attached directly to the torch. The bellows 30 is biased to collapsed position by a leaf spring 32 secured at 33 to the wall of the casing 29. A rod 34 is secured to one end of the bellows and is adapted to engage a pivoted arm 35 having a contact 36 which may engage a fixed contact 37. A spring 38 secured to the arm 35 and to a lug 39 on a wall of the casing 29 normally holds the contacts 36 and 37 in separated position. The mechanism affords a circuit breaker which may be forced to close the circuit when the pressure in the passage 28 is sufficiently high to expand the bellows 30, thus swinging the arm 35 on its pivot until the contacts 36 and 37 are engaged. Whenever the pressure drops below a predetermined minimum which is fixed by the strength of the springs 32 and 38, the contacts 36 and 37 will be separated.

Conductors 40 and 41 are connected to the contact 37 and the arm 35. The conductor 41 leads to the main switch 42 which may be disposed conveniently on the side of the flux feeder 21. A conductor 43 connects the switch 42 to the vibrator motor winding, and a conductor 44 completes the connection to a source of current. The conductor 40 is connected to the other terminal of the source of current.

Hence when the switch 42 is closed, and oxygen at the requisite pressure is flowing through the passage 28, the contact 36 will be forced into engagement with the contact 37, thus closing the circuit to the motor 24 which feeds the powdered flux to the stream of oxygen. Should the pressure of the oxygen stream in the passage 28 drop below a predetermined minimum, the bellows 39 will collapse, and the circuit will be broken at the contacts 36 and 37. The motor 24 will stop, and no more flux can be fed to the stream of oxygen until the pressure is restored.

The apparatus as described facilitates the operation of the cutting torch and particularly ensures against clogging of the line with flux in the event of any drop in the oxygen pressure, so that the volume of oxygen is insufficient to carry the normal flux feed. Obviously any feeding device other than that described in the Tyrner application may be utilized, so long as it is actuated by an electric motor which may be controlled in the manner described.

Various changes may be made in the form, arrangement and construction of the apparatus, without departing from the invention or sacrificing the advantages thereof.

I claim:

An oxygen cutting or scarfing torch having a torch tip and a passage for oxygen, a valve for controlling the flow of oxygen through said passage, a flux feeder for feeding flux into said oxygen passage including an electric motor, an electric switch carried by the torch for controlling the operation of said motor, a pressure-responsive device carried by the torch for operating the switch, and a conduit operatively associated with the torch placing the pressure-responsive device in communication with said passage in the torch at the downstream side of said valve.

HOWARD G. HUGHEY.

REFERENCES CITED

The following references are of record in the file of this patent:

UNITED STATES PATENTS

| Number | Name | Date |
|---|---|---|
| 968,350 | Harrison | Aug. 23, 1910 |
| 1,477,824 | Grindle | Dec. 18, 1923 |
| 1,582,446 | Bowman | Apr. 27, 1926 |
| 1,753,662 | Merker | Apr. 6, 1930 |
| 2,024,057 | Oldham | Dec. 10, 1935 |
| 2,226,325 | Sandford | Dec. 24, 1940 |